United States Patent
Arnold et al.

(10) Patent No.: US 8,007,042 B2
(45) Date of Patent: Aug. 30, 2011

(54) BICYCLE SADDLE

(75) Inventors: Franc Arnold, Koblenz (DE); Kim Tofaute, Koblenz (DE); Lutz Scheffer, Garmisch-Partenkirchen (DE); David Crafoord, Urmitz (DE); Andreas Heimerdinger, Urmitz (DE)

(73) Assignee: RTI Sports Vertrieb Von Sportartiklen (DE)

( * ) Notice: Subject to any disclaimer, the term of this patent is extended or adjusted under 35 U.S.C. 154(b) by 182 days.

(21) Appl. No.: 12/308,134

(22) PCT Filed: Jun. 6, 2007

(86) PCT No.: PCT/EP2007/055584
§ 371 (c)(1),
(2), (4) Date: Apr. 10, 2009

(87) PCT Pub. No.: WO2007/141299
PCT Pub. Date: Dec. 13, 2007

(65) Prior Publication Data
US 2009/0309396 A1    Dec. 17, 2009

(30) Foreign Application Priority Data
Jun. 9, 2006 (DE) .......................... 10 2006 009 062

(51) Int. Cl.
*B62J 1/00* (2006.01)
*B62J 1/02* (2006.01)

(52) U.S. Cl. .......................... 297/201; 297/196; 297/210

(58) Field of Classification Search .................. 297/201, 297/196, 198, 210, 211
See application file for complete search history.

(56) References Cited

U.S. PATENT DOCUMENTS

| 604,955 | A | 5/1898 | Avery | |
|---|---|---|---|---|
| 5,203,606 | A | 4/1993 | Granzotto | 297/201 |
| 7,121,622 | B1 | 10/2006 | Mendez | 297/201 |
| 7,537,280 | B2 * | 5/2009 | Bleloch | 297/201 |

FOREIGN PATENT DOCUMENTS

| DE | 551 059 C | 5/1932 |
|---|---|---|
| WO | WO 2005 054045 | 6/2005 |

OTHER PUBLICATIONS

International Search Report dated Aug. 17, 2007 from PCT/EP2007/055584.

* cited by examiner

*Primary Examiner* — Anthony D Barfield
(74) *Attorney, Agent, or Firm* — Ohlandt, Greeley, Ruggiero & Perle, LLP

(57) ABSTRACT

A bicycle saddle, in particular, a men's bicycle saddle, has a seat part and a front part. A spring arm and a damping arm are connected fixedly to the front part. One end of the spring arm is likewise connected fixedly to the seat part via a retaining element. One end of the damping arm is not connected to the seat part and, if a force occurs in the genital region, is movable in the direction of an arrow. Damping of the movement takes place here on account of the elastomeric body which reduces a pressure occurring in the genital region of the cyclist.

12 Claims, 3 Drawing Sheets

BICYCLE SADDLE

BACKGROUND

1. Field of the Disclosure

The disclosure refers to a bicycle saddle, in particular a men's bicycle saddle, as it is used for bicycles, especially for mountain bikes, racing bikes and the like.

2. Discussion of the Background Art

Generally, bicycle saddles has a seat part in the rear portion of the bicycle saddle, which is intended for the backsides of a cyclist. Seen in the riding direction, the seat part passes into a narrow and elongate front part. It is a drawback of such a bicycle saddle that pressure is exerted by the bicycle saddle on the genital region of a cyclist while cycling. The pressure on the genital region is uncomfortable to the cyclist and reduces the riding comfort. Moreover, the cyclist risks permanent health problems, especially when riding the bike for extended periods of time.

From DE 199 32 031 A1, it is known to hingedly connect the front part of the bicycle saddle with the seat part so that the front part of the bicycle saddle can be tilted down to avoid pressure in the genital region. It is a disadvantage of this bicycle saddle that no relief is actually achieved in the genital region when the front part is tilted away. In particular, it is not possible to individually adjust the bicycle saddle to a cyclist.

Moreover, a split bicycle saddle is known from DE 20 2004 013 746.1, having a seat part and a front part, allowing for a relative horizontal movement between the seat part and the front part in the genital region. Here, the genital region is that region of the front part directed towards the seat part. Possibly, the genital region may also extend further into an adjacent partial region of the seat part. The horizontal position of the front part relative to the seat part is adjustable in the genital region of the saddle described in DE 20 2004 013 746.1. For this purpose, the bottom sides of the front part and the seat part are connected with two rod-shaped elements extending at a distance from the bottom side. Spacer elements are arranged between the rod-shaped elements and the bottom side of the front part. By changing the length of the spacer elements, the horizontal position of the genital region of the front part of the saddle is adjusted with respect to the seat part of the saddle. The rod-shaped elements are resilient so that the front part will yield upon correspondingly great forces occurring in the genital region. However, this saddle structure is disadvantageous in that rather large structural space is required in the region of the saddle frame, i.e. that in particular flat or low-profile saddle frames can not be used.

It is an object of the present disclosure to provide a bicycle saddle, in particular, a men's bicycle saddle, with which pressure occurring in the genital region of a cyclist can be reduced in a simple manner.

SUMMARY

According to the disclosure, a spring arm is fixedly connected with the front part. The spring arm is movably connected with the seat part of the bicycle saddle through a retaining element. Further, an elastomeric body is provided to dampen the relative movement between the front part and the seat part. The elastomeric body further serves to generate of a restoring force so that the relative position of the two saddle parts is always substantially the same in an unloaded state. An elastomeric body, as provided by the disclosure, makes it possible to achieve good damping properties. In particular, the elastomeric bodies can be replaceable so that an individual adjustment of the damping characteristic to the needs of the user is allowed. As provided by the disclosure, the spring arm fixedly connected with the front part allows for a simple force transmission from the front part to the elastomeric body. Such a spring arm, which may be a thin metal part or a corresponding plastics part, offers the advantage of being simple to manufacture and requiring only a very limited structural space.

In particular, the elastomeric body may also serve as a retaining element so that the elastomeric element assumes both the damping and the fastening functions.

In a preferred embodiment, the elastomeric body is configured as a pressure body, thus especially serving to absorb pressure forces. Such an elastomeric body is thus elastically deformable especially by compression. In a particularly preferred embodiment, a retaining arm is connected with the seat part so that the pressure body is arranged between spring arm and the holding arm.

In a preferred embodiment, the elastomeric body is configured as a tensile member, thus especially serving to absorb tensile forces. Here, this elastomeric body is arranged in particular between the spring arm and the seat part. Thereby, a good damping characteristic can be realized, while the structural space is very small. In a particularly preferred embodiment, the tensile member is connected with the spring arm and is fixedly connected with the bottom face of the seat part. No additional fastening of the elastomeric body is required. In particular, the connection of the elastomeric body with the spring arm and the bottom face of the seat part may be achieved by vulcanizing, gluing or the like.

In a particularly preferred embodiment of the disclosure, a damping arm is provided. The damping arm is connected, in particular, with the front part of the saddle and extends towards the seat part. In this context, the damping arm may replace the elastomeric body or it may be provided in addition to the elastomeric body. Preferably, the damping arm is connected with the front part of the saddle via a common fastening element. It is particularly preferred that a damping element, in particular the elastomeric body, is provided between the damping arm and the spring arm. In the non-loaded state, the damping arm preferably abuts on the bottom face of the seat part. As soon as loads occur in the genital region, the front part is moved in the genital region relative to the seat part or pushed downward. Here, the damping arm connected with the front part is moved together with the movement of the front part. Via the damping arm, the force is transferred onto the damping element, especially onto the elastomeric body arranged between the damping arm and the spring arm. This is possible, especially because the damping arm is not connected or movably connected with the seat part, whereas, however, the spring arm is fixedly connected with the seat part in a particularly preferred embodiment.

In a particularly preferred embodiment, the spring arm and the damping arm are not movable relative to each other or are stationary with respect to each other at a first end that is, in particular, connected with the front part of the saddle. At the second ends, the damping arm is movable relative to the spring arm.

Preferably, a guide element is provided which is connected with the damping arm and/or the seat part. The guide element guarantees that forces occurring during the movement of the damping arm are transferred exactly onto an elastomeric body possibly provided.

In all aforementioned embodiments, an inverted arrangement of the spring device with respect to the front part and the seat part is possible as well so that a fixed or movable connection of one of both parts is realized in an inverted manner. However, the above described embodiments are always preferred, wherein in particular the spring arm is fixedly connected with the front part of the saddle.

BRIEF DESCRIPTION OF THE DRAWINGS

The following is a detailed description of preferred embodiments of the disclosure with reference to the associated drawings.

DETAILED DESCRIPTION OF THE PREFERRED EMBODIMENT

Figure 1:
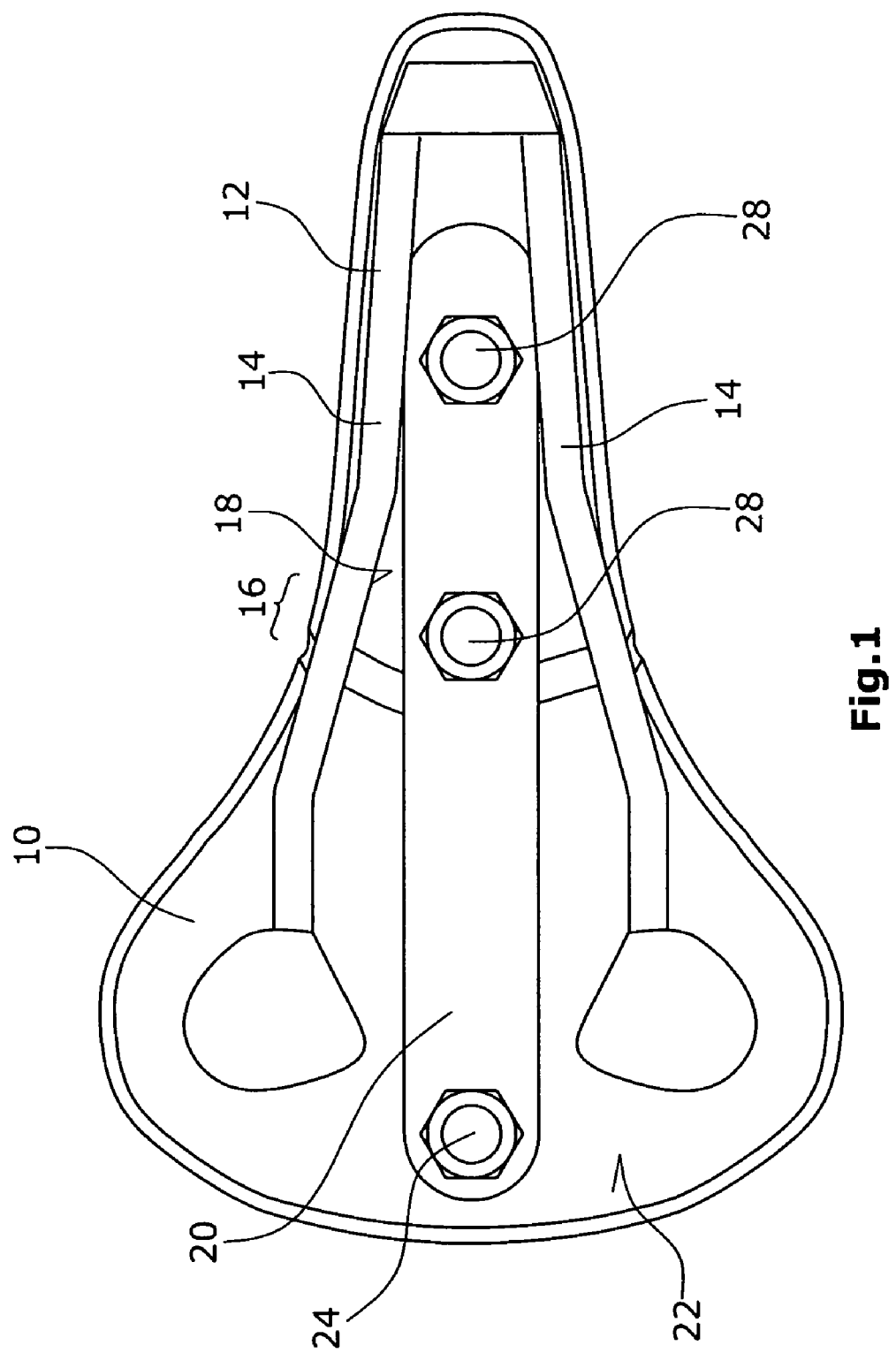
FIG. 1 is a schematic perspective bottom view of a first embodiment of the bicycle saddle according to the present disclosure, FIG. 2 a schematic perspective side elevational view of the seat part of the first embodiment of the bicycle saddle according to the present disclosure, seen from below, FIG. 3 a schematic sectional view in the longitudinal direction of a bicycle saddle according to the first preferred embodiment, FIG. 4 a schematic sectional view in the longitudinal direction of a bicycle saddle according to the second preferred embodiment, and FIG. 5 a schematic sectional view in the longitudinal direction of a bicycle saddle according to the second preferred embodiment.

In a first preferred embodiment of the disclosure (FIGS. 1-3), a bicycle saddle comprises a seat part 10 as well as a front part 12. The seat part 10 is spaced from the front part 12 so that they are two separate parts. Possibly, both parts are interconnected by a flexible intermediate element. It is also possible that the padding of the saddle extends over both the seat part and the front part, thereby spanning the gap between both parts. Two struts 14 are fixedly connected with the front part 12 and the seat part 14. The struts 14 form the saddle frame which may be connected with a saddle post via a connector member. The front part 12 is movable vertically relative to the seat part 10 especially in a genital region 16 of the front part 12 directed towards the seat part 10.

For a limitation of the mobility and a dampening of the movement, the disclosure provides a spring arm 20 fixedly connected with a bottom side 18 of the front part 12. The spring arm 20 is slightly wavy or S-shaped, when seen from the side (FIG. 3), and has a greater distance to the bottom side 22 of the seat part 10 than to the bottom side 18 of the front part 12. In the particularly preferred embodiment illustrated, the spring arm is also fixedly connected with the seat part 10 via a retaining element 24. The spring arm itself is elastic and may be deformed elastically by pressure in the genital region of the front part 12 of the saddle.

Figure 2:
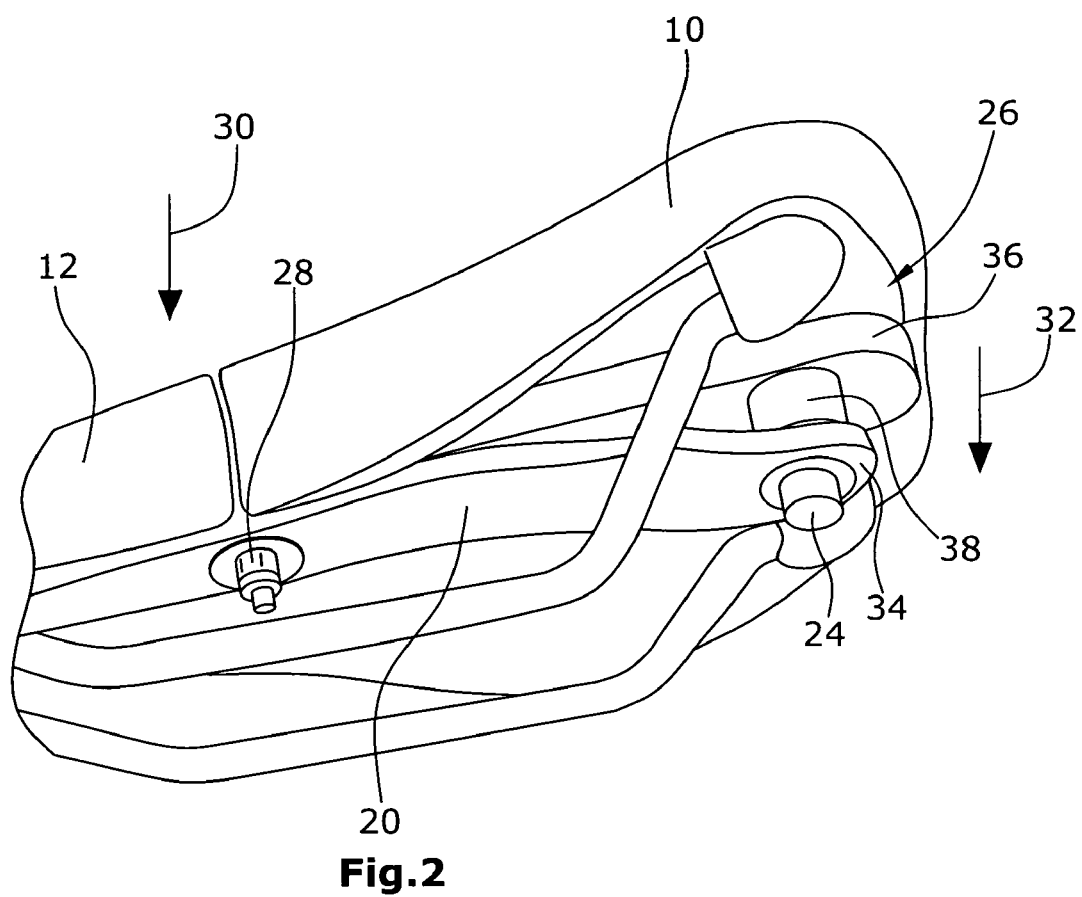
Figure 3:
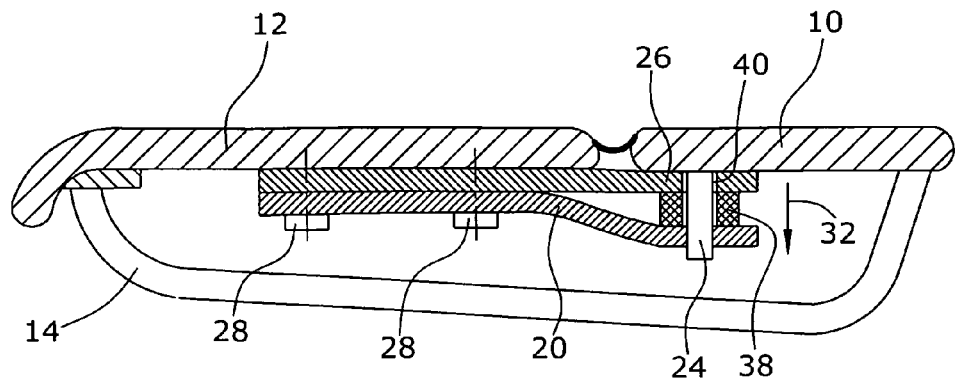

A particularly good damping characteristic can be achieved by providing a damping arm 26. Together with the spring arm 20, the damping arm 26 is fixedly connected with the front part 12 through common fastening elements 28. The damping arm 26 is not or only movably connected with the seat part 10. By applying a force 30 in the genital region 16 of the front part 12, the damping arm 26 is moved towards the spring arm 20 in the direction of an arrow 32 (FIG. 2). An elastomeric body 38, in particular serving the absorption of pressure forces, is provided for damping purposes between the spring arm 20 and the damping arm 26 in the area of the ends 34 and 36, respectively.

In the embodiment illustrated, the restraining element 24 provided for a fixed connection of the spring arm 20 with the seat part 10 also serves as a guide element. To this avail, the retaining element 24, which is of rod-shaped configuration in the embodiment illustrated, extends through an opening 40 in the damping arm 26. The damping arm 26 is thus guided when moving in the direction of the arrow 38 and can not deviate sideways.

Figure 4:
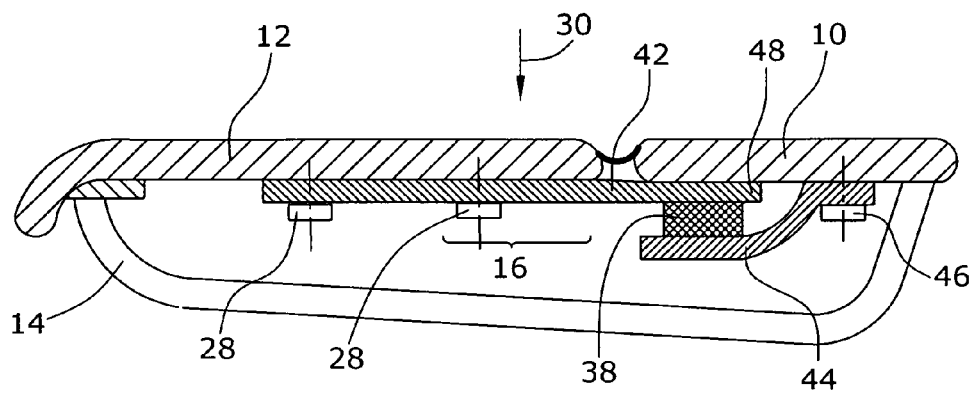

In the second embodiment (FIG. 4) similar and identical elements are identified by the same reference numerals.

The spring arm 42 is fixedly connected with the front part 12 via fastening elements 28. In this embodiment, the spring arm 42 is preferably formed from a non-elastic or only slightly elastic material. The spring arm 42 is thus preferably rigid. In this embodiment, the spring arm 42 is not fixedly connected with the seat part 10. Rather, an indirect connection is provided through a retaining arm 44 serving as the retaining element and being fixedly connected with the seat part 10 via a fastening means 46. The spring arm 42 and the retaining arm 44 partly overlap in the longitudinal direction of the saddle so that an elastomeric body 38, in particular a pressure element, can be arranged between the spring arm 42 and the retaining arm 44. When the genital region 16 of the front part 12 is loaded by a force 30, the same will be pressed downward in FIG. 4. Thereby, one end 48 of the spring arm 42 is also pressed downward in FIG. 4, deforming the elastomeric body 38.

In the third preferred embodiment (FIG. 5) identical parts are identified by the same reference numerals.

A slightly wavy or S-shaped spring arm 20, seen in side elevation, is fixedly connected with the front part 12 through fastening elements 28, as in the first embodiment. The end 34 of the spring arm 20 is spaced from the bottom side 22 of the seat part 10. Between the end 34 of the spring arm 20 and the seat part 10, an elastomeric body 50 is arranged. The elastomeric body 50 is a tensile member.

Figure 5:
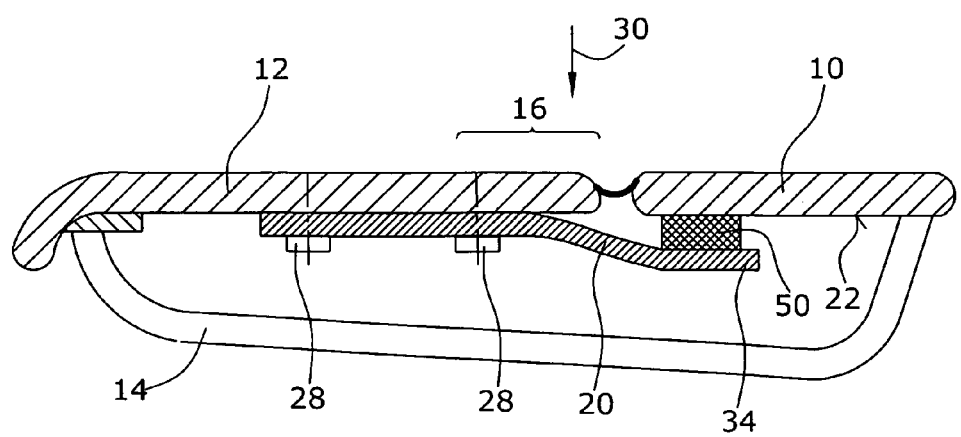

A force 30 acting in the genital region 16 moves the genital region 16 as well as the end 34 of the spring arm downward in FIG. 5. Thereby, tensile forces are exerted on the elastically deformable tensile member 50.

What is claimed is:

1. A bicycle saddle comprising:
   a seat part for the backside of a cyclist,
   a front part with a genital region directed towards the seat part, at least the genital region being movable relative to the seat part,
   a spring arm fixedly connected with the seat part or the front part, the spring arm being connected with the front part or the seat part through a retaining element,
   an elastomeric body for damping the relative movement between the front part and the seat part as well as for generating a restoring force, and
   a damping arm fixedly connected with the front part, wherein the elastomeric body is arranged between the damping arm and the spring arm.

2. The bicycle saddle of claim 1, wherein the elastomeric body is configured as a pressure member and is arranged between a retaining arm of the retaining element and the spring arm.

3. The bicycle saddle of claim 1, wherein the elastomeric body is configured as a tensile member and is arranged between the spring arm and the seat part or the front part.

4. The bicycle saddle of claim 3, wherein the tensile member is fixedly connected with the spring arm and to a bottom side of the seat part or the front part.

5. The bicycle saddle of claim 1, wherein the damping arm is fixedly connected with the front part or the seat part through a common fastening element.

6. The bicycle saddle of claim 1, wherein the spring arm and the damping arm are static with respect to each other and contact each other at a first end connected with the front part.

7. The bicycle saddle of claim 1, wherein the spring arm and the damping arm are movable relative to each other at second ends.

8. The bicycle saddle of claim 7, wherein the spring arm has its second end fixedly connected with the seat part or the front part through said retaining element.

9. The bicycle saddle of claim 7, wherein the elastomeric body is arranged between the damping arm and the spring arm in the area of the second ends.

10. The bicycle saddle of claim 1, wherein the damping arm is connected with the seat part.

11. The bicycle saddle of claim 1, wherein the damping arm has an opening through which a guide element for guiding the movement of the damping arm is provided, said guide element being connected with the seat part.

12. The bicycle saddle of claim 11, wherein the guide element is part of the retaining element.

* * * * *